US006857060B2

(12) United States Patent
Elias et al.

(10) Patent No.: US 6,857,060 B2
(45) Date of Patent: Feb. 15, 2005

(54) SYSTEM, APPARATUS AND METHOD FOR PRIORITIZING INSTRUCTIONS AND ELIMINATING USELESS INSTRUCTIONS

(75) Inventors: George Elias, Tel-Aviv (IL); Adi Yoaz, Austin, TX (US); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 09/822,894

(22) Filed: Mar. 30, 2001

(65) Prior Publication Data

US 2002/0178346 A1 Nov. 28, 2002

(51) Int. Cl.[7] .................................. G06F 9/30
(52) U.S. Cl. ........................ 712/217; 712/218
(58) Field of Search ..................... 712/218, 217

(56) References Cited

U.S. PATENT DOCUMENTS

| | | | |
|---|---|---|---|
| 5,261,071 A | 11/1993 | Lyon | |
| 5,526,499 A | 6/1996 | Bernstein et al. | |
| 5,584,001 A | 12/1996 | Hoyt et al. | |
| 5,606,670 A | 2/1997 | Abramson et al. | |
| 5,615,350 A | 3/1997 | Hesson et al. | |
| 5,666,506 A | 9/1997 | Hesson et al. | |
| 5,784,586 A | 7/1998 | Simone et al. | |
| 5,802,588 A | 9/1998 | Ramagopal et al. | |
| 5,805,851 A * | 9/1998 | Lotz | 712/216 |
| 5,809,275 A | 9/1998 | Lesartre | |
| 5,835,747 A | 11/1998 | Trull | |
| 5,987,595 A | 11/1999 | Yoaz et al. | |
| 6,098,168 A * | 8/2000 | Eisen et al. | 712/218 |
| 6,470,445 B1 * | 10/2002 | Arnold et al. | 712/218 |

OTHER PUBLICATIONS

Val Popescu, Merle Schultz, John Spracklen, Gary Gibson, Bruce Lightner, and David Isaman; *The Metaflow Architecture*, IEEE Micro, 0272/1732/97/0600–0010S01.00 1991 IEEE, p. 10–13, 63–72.

* cited by examiner

*Primary Examiner*—Richard L. Ellis
*Assistant Examiner*—Barry O'Brien
(74) *Attorney, Agent, or Firm*—Blakely, Sokoloff, Taylor & Zafman LLP

(57) ABSTRACT

According to one embodiment, a method features operations for executing instructions in an instruction window. The first and second instructions are examined to determine their sources and destinations. The written on bit of the first instruction is set to a "written on" state if the destinations of the first and second instructions are the same while a used bit of the first instruction is set to a "used" state if the source of the second instruction is the destination of the first instruction. Thereafter, a priority of the first instruction can be determined from the written on and used bits.

25 Claims, 5 Drawing Sheets

| INSTRUCTION POINTER | REDUNDANCY PREDICTOR | INSTRUCTION | COMMENTS |
|---|---|---|---|
| 341B | NOT REDUNDANT | MOVE AX, VALUE1 | ;Write to AX |
| 341D | NOT REDUNDANT | ADD BX, VALUE2 | |
| 3420 | REDUNDANT | ADD AX, BX | ;Use AX and Write to AX |
| 3422 | NOT REDUNDANT | CMP DX, CX | |
| 3424 | NOT REDUNDANT | JNL BRANCH2 | |
| 3426 | NOT REDUNDANT | MOV AX, CX | ;Write to AX Without Using Previous Value |

FIG. 3A

| INSTRUCTION | WRITTEN ON | USED | PRIORITY |
|---|---|---|---|
| 31 — MOV AX, VALUE1 | NOT WRITTEN ON | NOT USED | LOW |

| INSTRUCTION | WRITTEN ON | USED | PRIORITY |
|---|---|---|---|
| 32 — ADD BX, VALUE2 | NOT WRITTEN ON | NOT USED | LOW |
| 31 — MOV AX, VALUE1 | NOT WRITTEN ON | NOT USED | LOW |

| INSTRUCTION | WRITTEN ON | USED | PRIORITY |
|---|---|---|---|
| 33 — ADD AX, BX | NOT WRITTEN ON | NOT USED | LOW |
| 32 — ADD BX, VALUE2 | NOT WRITTEN ON | USED | HIGH |
| 31 — MOV AX, VALUE1 | WRITTEN ON | USED | HIGH |

| INSTRUCTION | WRITTEN ON | USED | PRIORITY |
|---|---|---|---|
| 34 — CMP DX, CX | WRITTEN ON | USED | HIGH |
| 33 — ADD AX, BX | NOT WRITTEN ON | NOT USED | LOW |
| 32 — ADD BX, VALUE2 | NOT WRITTEN ON | USED | HIGH |
| 31 — MOV AX, VALUE1 | WRITTEN ON | USED | HIGH |

| INSTRUCTION | WRITTEN ON | USED | PRIORITY |
|---|---|---|---|
| 35 — JNL BRANCH2 | NOT WRITTEN ON | NOT USED | LOW |
| 34 — CMP DX, CX | WRITTEN ON | USED | HIGH |
| 33 — ADD AX, BX | NOT WRITTEN ON | NOT USED | LOW |
| 32 — ADD BX, VALUE2 | NOT WRITTEN ON | USED | HIGH |
| 31 — MOV AX, VALUE1 | WRITTEN ON | USED | HIGH |

⎬ 8

16   18   20   22

| INSTRUCTION | WRITTEN ON | USED | PRIORITY |
|---|---|---|---|
| 36 — MOV AX, CX | NOT WRITTEN ON | NOT USED | LOW |
| 35 — JNL BRANCH2 | NOT WRITTEN ON | NOT USED | LOW |
| 34 — CMP DX, CX | WRITTEN ON | USED | HIGH |
| 33 — ADD AX, BX | WRITTEN ON | NOT USED | REDUNDANT |
| 32 — ADD BX, VALUE2 | NOT WRITTEN ON | USED | HIGH |
| 31 — MOV AX, VALUE1 | WRITTEN ON | USED | HIGH |

*FIG. 3F*

| INSTRUCTION | WRITTEN ON | USED | PRIORITY |
|---|---|---|---|
| 36 — MOV AX, CX | NOT WRITTEN ON | NOT USED | LOW |
| 35 — JNL BRANCH2 | NOT WRITTEN ON | NOT USED | LOW |
| 34 — CMP DX, CX | WRITTEN ON | USED | HIGH |
| 33 — ADD AX, BX | WRITTEN ON | NOT USED | REDUNDANT |
| 32 — ADD BX, VALUE2 | NOT WRITTEN ON | USED | HIGH |

*FIG. 3G*

| INSTRUCTION | WRITTEN ON | USED | PRIORITY |
|---|---|---|---|
| 36 — MOV AX, CX | NOT WRITTEN ON | NOT USED | LOW |
| 35 — JNL BRANCH2 | NOT WRITTEN ON | NOT USED | LOW |
| 34 — CMP DX, CX | WRITTEN ON | USED | HIGH |
| 33 — ADD AX, BX | WRITTEN ON | NOT USED | REDUNDANT |

*FIG. 3H*

| INSTRUCTION | WRITTEN ON | USED | PRIORITY |
|---|---|---|---|
| 36 — MOV AX, CX | NOT WRITTEN ON | NOT USED | LOW |
| 35 — JNL BRANCH2 | NOT WRITTEN ON | NOT USED | LOW |
| 34 — CMP DX, CX | NOT WRITTEN ON | USED | HIGH |

*FIG. 3I*

| INSTRUCTION | WRITTEN ON | USED | PRIORITY |
|---|---|---|---|
| 36 — MOV AX, CX | NOT WRITTEN ON | NOT USED | LOW |
| 35 — JNL BRANCH2 | NOT WRITTEN ON | NOT USED | LOW |

*FIG. 3J*

SYSTEM, APPARATUS AND METHOD FOR PRIORITIZING INSTRUCTIONS AND ELIMINATING USELESS INSTRUCTIONS

FIELD

This invention relates to the field of computer instruction processing. More particularly, this invention relates to out-of-order execution of instructions.

BACKGROUND

Most complex computer programs contain instructions whose results are never used. These useless instructions may occur in any program regardless of size or complexity. An example of useless instructions occurs upon exiting a procedure. Generally, when the processor calls a procedure, the processor saves the registers on the stack to preserve the data in the registers for use after exiting the procedure. Upon exiting the procedure, the processor restores the data in the registers with the data previously stored on the stack. If the processor did not use the registers during the procedure, both storing the registers to the stack and restoring the registers from the stack were useless operations. Also, if the processor did not use the registers after the procedure has returned, restoring the registers from the stack was a useless operation. A similar case may also arise from other run time artifacts or poor programming techniques and modifications to the program. For instance, assume a program or instruction stream having three instructions. The first and third instructions write to a particular register. The second instruction reads that register. If the second instruction, due to (e.g.,) partial optimizations, is deleted or omitted, then the first instruction is useless because the third instruction overwrites the register before the value written by the first instruction is ever used.

Ideally, the compiler should have eliminated those useless instructions. However, attempts during compilation to eliminate these useless instructions fail because the conditions determining the actual program flow are usually set during run time.

Note also that a seemingly useless instruction may become so if an exception occurs after the processor executes a useless operation, but before the execution of the instruction that rendered the useless operation useless. In that case, the exception handler may want to access the data that would have been written during the useless instruction. Hence, the loss of that data greatly complicates trouble-shooting and exception handling.

BRIEF DESCRIPTION OF THE DRAWINGS

The features and advantages of the invention will become apparent from the following detailed description in which:

FIGS. 3A–3J are exemplary diagrams of the instruction window of an embodiment of the invention.

DETAILED DESCRIPTION OF THE INVENTION

The present invention provides a method, apparatus, and system for prioritizing instructions and eliminating useless instructions.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Figure 1:
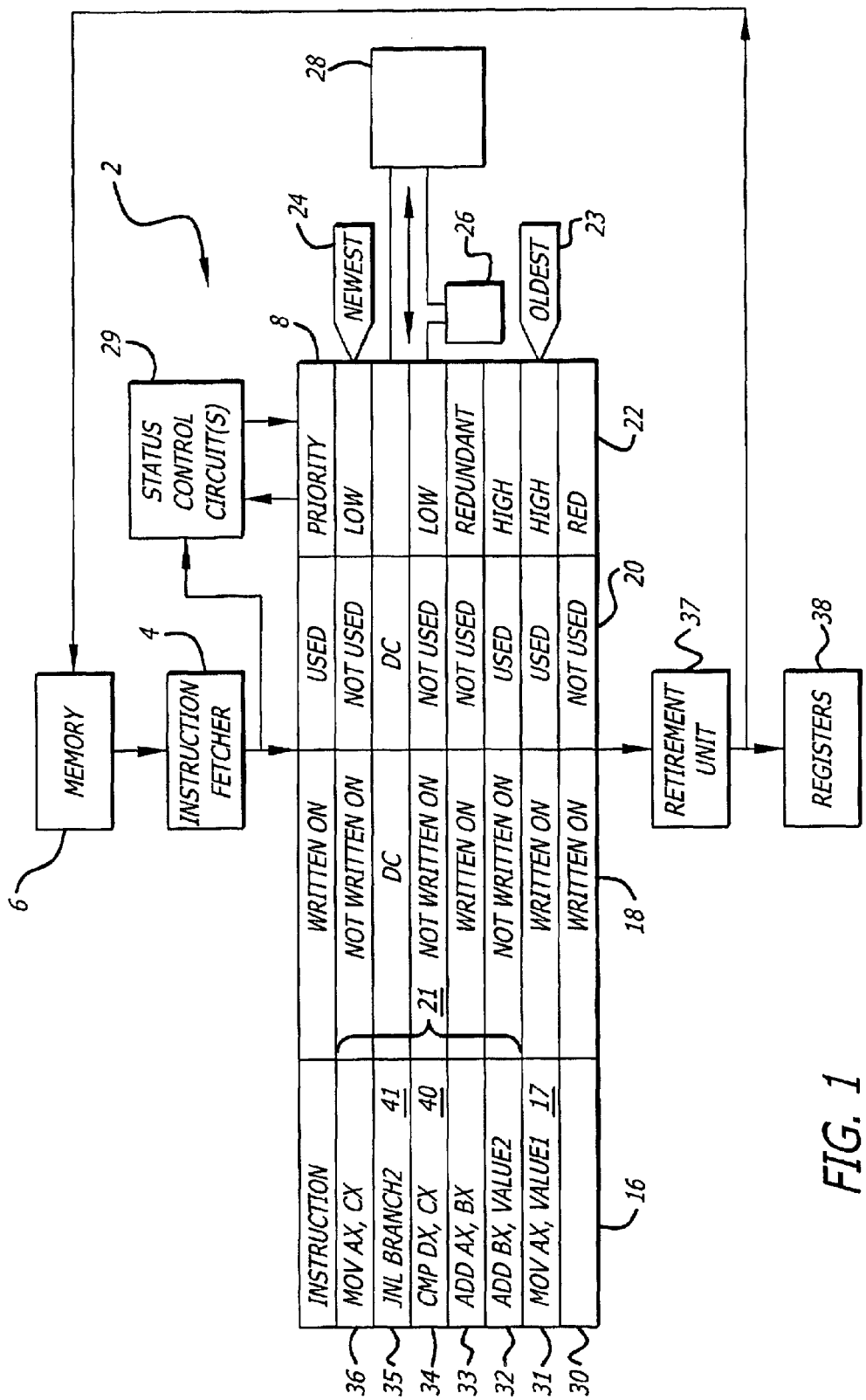
FIG. 1 is an exemplary diagram of a processor of an embodiment of the invention.

FIG. 1 illustrates a simplified processor 2 of the present invention. The processor 2 may be part of a computer system including memory external to the processor 2, input/output devices and other devices well known to the art. An instruction fetcher 4 continually fetches and decodes instructions from a memory 6. The decoded instructions are transferred to an instruction window 8 in an order that preserves the original instruction sequence. The instruction window 8 is a memory device that is organized like a table. In one embodiment of the present invention, the instruction window 8 is a reorder buffer.

Each entry 30–36 of the instruction window 8 contains at least an instruction label 16, a written on bit 18, a used bit 20 and a priority field or bits 22. The instruction window 8 may have a circular organization with pointers 23 and 24 directed to the oldest and newest instructions transferred to occupied entries 31 and 36 therein, respectfully.

Monitoring a communication path between the fetcher 4 and receiving/providing information with the instruction window 8, a status circuit (or circuits) 29 sets the written on bit 18 and the used bit 20 and uses the written on bit 18 and used bit 20 to determine the priority of each of the occupied entries 31–36. In general, the status circuit 29 is responsible for not only providing status information for the priority field 22 for each new instruction, but also updating status information within the priority field 22 for each instruction already occupying one or more of the entries 31–36.

A controller 26 sends instructions from the instruction window 8 to one or more execution units 28. The controller 26 also checks other status bits (not shown) of the occupied entries 31–36 to determine which of the unexecuted instructions are ready to execute (e.g. their resources are available), for instance, which status bits indicate "ready" and "unexecuted". The controller 26 further checks the priority 22 of each occupied entry 31–36. Then, the controller 26 sends unexecuted instructions in occupied entries 31–36 to the execution unit 28 in an order determined, at least in part, by the priority 22 of the occupied entries 31–36.

Figures 2, 4:
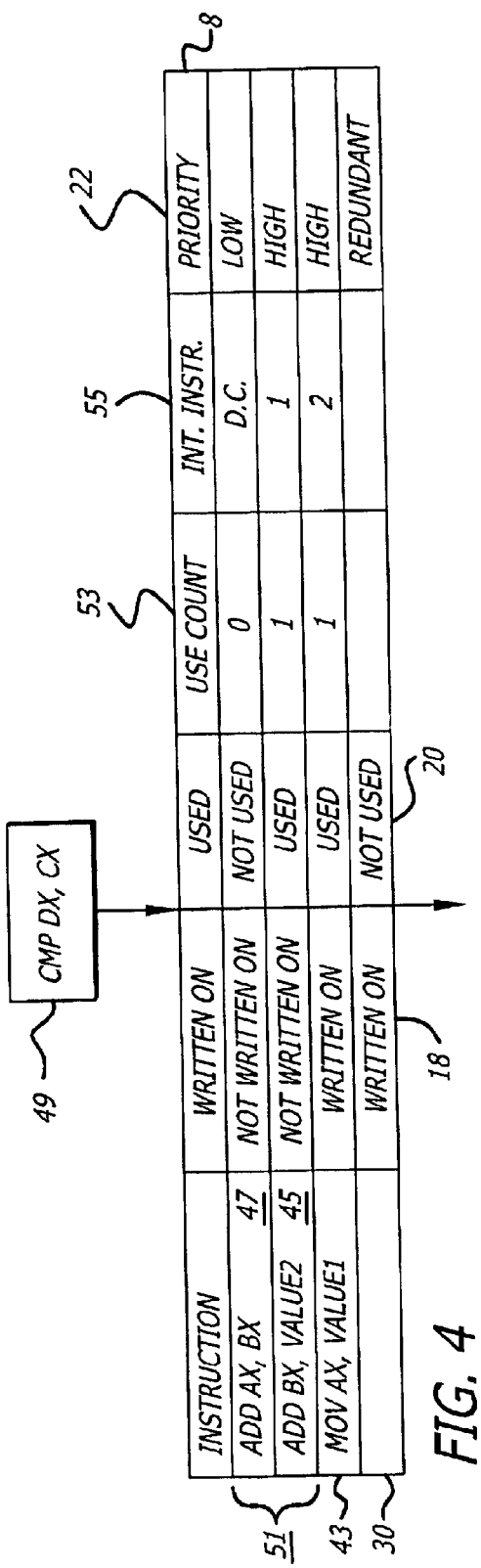
FIG. 2 is an exemplary diagram of an embodiment of the invention.
FIG. 4 is an exemplary diagram of the instruction window of an embodiment of the invention.

Herein, for this embodiment, the fetcher 4 tries to keep the instruction window 8 full by storing instructions in empty instruction entries as the instruction entries 31–36 become empty. The controller 26 tries to execute instructions in the instruction window 8 as fast as possible by using the possibility of executing instructions out-of-the-order of the original instruction sequence 27 as shown in FIG. 2. After an instruction is executed, the execution results are stored into a result location (not shown) in the instruction window associated with the executed instruction and its status bit is change to "executed." A retirement unit 37 periodically reads the status bits of the occupied entries 31–36 of the instruction window 16 and retires executed or "done" instructions, by sending the results to memory 6 or registers 38. The retirement unit 37 retires the executed instructions in an order that generally follows the original instruction sequence 27.

For example, to determine the priority 22 for the instructions or occupied entries 31–36, the status circuit 29 sets the used bit 20 of an occupied entry or instruction 17 to a "used" state if the destination 19 (see FIG. 2) of the instruction 17 is used as a source 25 in any instruction 21 in the instruction window 8 following the instruction 17 in the original instruction sequence 27. Note that both registers and memory locations may be operands of the instruction 17. An operand may also be either a source 25, a destination 19, or both. If the destination 19 of the instruction 17 is not used as a source 25 in any of the instructions 21 in the instruction window 8 that follow the instruction 17 in the original instruction sequence 27, the used bit 20 for instruction 17 is set to a "unused" state. Thus, the used bit 20 may also be referred to as a subsequent use bit 20.

For the occupied entries 31–36 in the instruction window 8, the written on bit 18 is set to a "written on" state if the destination 19 of the instruction 17 will be written on by any instruction 21 in the instruction window 8 that follows the instruction 17 in the original instruction sequence 27. If the destination 19 of the instruction 17 will not be written on by any of the instructions 21 in the instruction window that follow the instruction in the original instruction sequence 27, the written on bit is set to a "not written on" state. Thus, the written on bit 18 may also be referred to as a subsequent written on bit 20.

In other words, for each instruction 17, the status circuit 29 looks ahead in the instruction window 8 to determine whether a subsequent instruction 21 will use the results of the prior instruction 17. The status circuit 29 also looks ahead in the instruction window 8 to determine whether a subsequent instruction 21 writes on, over or to the results of the prior instruction 17. If any subsequent instruction 21 will use the results 19 of a particular, prior instruction 17, then the particular previous instruction 17 is assigned a high priority for execution. In other words, a subsequent use of the results 19 of a prior instruction 17 causes the priority of the prior instruction 17 to be set to high.

If no subsequent instruction 21 uses the result 19 of the particular, prior instruction 17 the status circuit 29 examines the prior instruction's 17 written on bit to determine the priority level for the prior instruction 17. If, in addition to not being used by a subsequent instruction 21, the result 19 of a prior instruction 17 is not written on by a subsequent instruction 21 in the instruction window 8, the status circuit 29 sets the priority of the prior instruction 17 to low priority. The reason for the assignment of a low, rather than a useless or a redundant, priority level is that it is possible that the next instruction to enter the instruction window 8 might either use or over write the result 19 of the prior instruction 17. Thus, it may not be possible to safely ignore or eliminate the prior instruction 17 because of what an instruction entering the instruction window 8 after the prior instruction might do with, or to, the result 19 of the prior instruction 17.

The next instruction to enter the instruction window 8 may be referred to as an incoming instruction. In one embodiment of the present invention, as each incoming instruction enters the instruction window 8 the status circuit 29 examines the source or sources 25 and destination or destinations 19 of the incoming instruction. Accordingly, the status circuit 29 then sets the used bit, written on bit and priority level of the incoming instruction and the instructions already present, or existing, in the instruction window 8.

The case in which the instruction 17 is found to be useless is that situation when the result of the instruction 17 is written over by a subsequent instruction 21 before the result 19 is used. Accordingly, if no subsequent instruction 21 in the instruction window 8 uses the result 19 of the instruction 17 and if a subsequent instruction 21 writes over the result 19 of the instruction 17, the instruction 17 is assigned a priority level of "redundant". The redundant priority indicates that the instruction 17 is useless because the subsequent instruction writes over the result 19 of the instruction 17 before the result 19 is used.

The above relationships between the priority level of each instruction in the instruction window 8 and the subsequent treatment of each instruction's result, or destination, can be summarized in a table as follows:

| Used Bit | Written On Bit | Priority Level |
| --- | --- | --- |
| Used | Not Written On | High |
| Used | Written On | High |
| Not Used | Not Written On | Low |
| Not Used | Written On | Redundant |

The relationships can also be summarized by the following logical equations:

HIGH_PRIORITY=SUBSEQUENT_USE;

LOW_PRIORITY=NOT (SUBSEQUENT_USE) AND NOT (SUBSEQUENTLY_WRITTEN_ON); and

REDUNDANT_PRIORITY=NOT (SUBSEQUENT_USE) AND SUBSEQUENTLY_WRITTEN_ON

It should be noted that the used bit 20 could default to the used state to ensure a high priority for a select instruction or instructions. For example, conditional jump instructions could always have a high priority. Note that compare instructions 40 writes the flags register and is assigned a status according to the usage of the flags register as follows. The status circuit 29 sets the written on bit to a "written on" state when a subsequent instruction alters the flags set by the compare instruction 40. The used bit is set to a "used" state since conditional jumps 41, which use the flags set by the compare instruction 40, usually follow the compare instruction 40. The priority of the compare instruction 40 corresponds to the setting of the written on and used bits of the compare instruction 40.

In the alternative, certain instructions could be assigned used and written on values of a "don't care" (DC) state. The resulting priority could be selected from high, low, redundant, or even normal if the priority scheme includes a normal priority level. In the alternative, the subsequent use bit 20 could default to the not used state to allow the subsequent write condition to determine the priority of a certain instruction or instructions. The invention also contemplates instructions that may not have a source, a destination, or may not have either. For instance, a WAIT or HALT instruction has neither a source nor a destination. For these types of instructions the priority, the used bit and the written on bit may be defaulted to preselected values. Therefore, the present invention accounts for instructions which potentially may have a source, a destination, both, neither, or a source or a destination.

Referring now to FIGS. 3A–3J and 4, illustrative embodiments of the instruction window 8 are illustrated as instructions enter, queue in and begin retiring from the instruction window 8. The processor is initialized, with the instruction window 8 empty. In FIG. 3A, instruction fetching from memory begins with a first instruction 43 being fetched and stored in the instruction window 8. The first instruction 43 is examined to determine the destination for the first instruction's result. For instance, for an IA32 family processor the MOV AX, VALUE1 instruction would have the AX register as the destination for its result. Since only the first instruction 43 exists in the instruction window 8, the first instruction's subsequent use bit is set to a "not used" state. Furthermore, since no subsequent instructions exist in the instruction window 8, the first instruction's subsequent write bit is set to a "not written on" state. The combination of the used bit and written on bit causes the priority for the first instruction 43 to equal low.

Herein, the processor executes each instruction as it enters the instruction window 8. Eventually, due to processor resources becoming busy, instructions will begin queuing in the instruction window 8. For purposes of illustration, it is assumed here that the instructions begin queuing immediately. In FIGS. 3B to 3F, instructions continue to enter and queue in the instruction window 8. As they do so, the used bits 20, written on bits, and priority levels 22 for each additional instruction are determined. Eventually, the processor begins executing and retiring instructions as in FIG. 3G to FIG. 3J. As instructions move through the instruction window 8, chronologically from FIG. 3A to FIG. 3J, the used bits 20, the written on bits 18 and the priority levels 22 may be continuously computed.

Note that instructions are executed out of order. For instance, in FIG. 3E, upon detecting a compare instruction occupying entry 34 followed by a conditional jump instruction occupying entry 35, the processor could immediately execute the compare instruction to determine from which branch of the program to fetch subsequent instructions even before the ADD AX, BX instruction occupying instruction entry 33 is executed. In the alternative, in FIG. 3H, the redundant ADD AX, BX instruction occupying entry 33 could be skipped or retired from the instruction window 8.

Referring now to FIG. 4, another exemplary embodiment of the present invention is illustrated. To load the instruction window 8 with the three instructions shown, the processor is initialized, preferably with the instruction window 8 empty. Instruction fetching from memory begins with the first instruction 43 being fetched and stored in the instruction window 8. The first instruction 43 is examined to determine the destination for the result of the first instruction 43. For instance, for an IA32 family processor, the MOV AX, VALUE1 instruction result would use as its destination the AX register. Since, initially, only the first instruction 43 exists in the instruction window 8, the first instruction's subsequent use bit is set to a "not used" state. Furthermore, since no subsequent instructions exist in the instruction window 8, the first instruction's subsequent write bit is set to a "not written on" state. The combination of the used bit and written on bit causes the priority for the first instruction 43 to be equal to low.

The processor executes each instruction as it enters the instruction window 8. Eventually, due to processor resources becoming busy, instructions will begin queuing in the instruction window 8. For purposes of illustration, it is assumed here that the instructions begin queuing immediately.

Referring still to FIG. 4, the processor fetches a second instruction 45 and stores it in the instruction window 8. During, or near, the beginning of this fetch, the second instruction 45 can be referred to as an incoming instruction 49. Also, since the second instruction 45 is subsequent to the first instruction 43 in the original instruction sequence 27 (see FIG. 2), the first instruction 43 can be referred to as the prior or previous instruction.

As the second instruction 45 comes into the instruction window 8, the implied and express operands of the second instruction 45 are examined. The operands of the second instruction 45 are compared to the destination of the first instruction 43. If the second instruction 45 uses the destination, or result, of the first instruction as a data source, then the subsequent use bit of the first instruction 43 is set to a "used" state. Otherwise, the subsequent use bit of the first instruction 43 is set to a "not used" state. The destination of the second instruction 45 is then determined. If the destination of the second instruction 45 is the same as the destination of the first instruction 43, then the written on bit of the first instruction 43 is set to a "written on" state.

As another incoming, third, instruction 47 enters the instruction window 8, the implied and express operands of the incoming instruction 47 are examined. The operands of the incoming instruction 47 operands are then checked using the processor's dependency tracking tables (not shown) to determine whether they match the destination of a prior instruction 43. If the incoming instruction 47 uses the destination of a prior instruction 43 as a data source then the subsequent use bit of that prior instruction 43 is set to a "used" state. Otherwise, the subsequent use bit of all prior instructions 43 are left as is. Note that determining which of the prior instructions within the instruction windows, if any, produce the destination that the current instruction consumes as a source is done by a simple lookup in the register allocation and map table used for register renaming. The destination of the incoming instruction 47 is then determined. If the destination of the incoming instruction 47 is the same as the destination of a prior instruction 43, then the written on bit of that prior instruction 43 is set to a "written on" state. Otherwise, the written on bit of all prior instructions 43 are left as is.

Eventually, enough processor resources become free so that the processor may execute an instruction in the instruction window 8. Based upon the used and written on bits of the instructions in the instruction window 8, the processor executes the instruction with the highest priority. If more than one instruction has the highest priority, the processor may decide which instruction to execute based on the order in which the instructions entered the instruction window 8 or upon some other secondary prioritization scheme.

Subsequently, executed instructions are retired from the instruction window 8 to free the potentially limited space of the instruction window 8 for the next incoming instruction 49. As the executed instruction is retired the used and overwritten bits of the retiring instruction are cleared, or reset, to not used and overwritten, thereby assigning the empty entry 30, or instruction space, a redundant priority. While not necessary, the resetting of the bits and priority of the temporarily empty entry 30 can be used to direct the processor away from wasting resources by examining the empty entry 30. The next incoming instruction 49 may then be fetched and brought into the instruction window 8.

In another embodiment of the invention, the status circuit 29 gathers additional data for each instruction. For instance, the status circuit 29 may count the number of uses to which subsequent instructions put the destination of a prior instruction. The count may be stored in a use or use count field 53. In this embodiment, the higher the number of uses, or subsequent use count 53, the higher the priority of the instruction. Additional information that may be gathered to affect prioritization includes the expected instruction latency (e.g. the longer the instruction's latency is, the higher the instruction's priority) and the position within the instruction window (e.g. the earlier the instruction's position, the higher the instruction's priority). Alternatively, instruction priority may be based on the used and over written bits, as described above with the use count 53 determining a secondary prioritization of the instructions.

In yet another embodiment, the number of intervening instructions between a first instruction to write to a destination and the first subsequent instruction to use that destination as a source may be counted or otherwise determined. Here, the more intervening instructions that are found, causes the priority of the first instruction to decrease. In other words, the more remote the subsequent use is, the lower the priority assigned the instruction 17. For this embodiment, an intervening instruction count or field 55 is added to the instruction window 8. For the most recent instruction to enter the instruction window 8, the intervening count 55 could be set to a "don't care" state (D.C.)

Another embodiment only determines priorities for select groups of instructions. While any group of instructions may be singled out, instructions which execute loads define one exemplary embodiment of the invention. A load occurs when an instruction requires the processor of FIG. 1 to fetch a value from memory 6 or store a value to memory 6. Since accessing the memory 6 results in I/O bus requests, I/O transactions, and memory access, considerable processor 2 time may be wasted if an instruction must wait while the load operation completes. Thus, in situations involving limited processor resource availability for implementing a priority scheme, the present invention can be limited to determining the priority of only load instructions.

In still another exemplary embodiment of the invention, instructions identified as useless, those with redundant priorities, may be eliminated from the instruction window 8 immediately when identified as useless as long as it is guaranteed that the entire instruction sequence up to and including the over-writing instruction will be executed without exceptions or the architecture semantic will allow such elimination. In an alternative embodiment, the retirement unit 37 waits until the instruction that over-writes the useless instruction's destination executes and is ready to retire before eliminating the useless instruction. This allows saving the value that would be written by the useless instruction for use in troubleshooting and exception handling.

Other exemplary embodiments include implementing the priority field 22, the used bit 20 and written on 18 bit in locations other than in the instruction window 8. For instance, a separate instruction window can be implemented in parallel with a reorder buffer, or the processor's reservation station or register alias tables can be expanded to accommodate the priority field 22, the used bit 20 and written on bit 18. It may also be beneficial to provide a table or other mechanism to map destinations, registers and memory values (variables), to the instructions in the instruction window. By using such a map, block changes to the used bits 20 and written on bits 18 of all of the instructions in the instruction windows could be implemented.

Referring back to FIG. 2, in another embodiment, a useless operation predictor may be employed. Each instruction of a program may have associated with it a useless instruction, or redundancy, predictor value (or bit) 25. During each execution of the program the priorities of the instructions are determined as described herein. If an instruction is identified as a redundant operation, then the redundancy predicted value 25 for that instruction is updated to indicate that, during that execution of the program, the instruction was identified as redundant. FIG. 2 shows the redundancy predictor value 25 as it might appear follow an execution of the program. For programs or modules that are frequently executed, the redundancy predictor value 25 may include fields to record the highest and the lowest priorities each instruction receives during any execution of the program. Thus, the redundancy predictor value 25 records the history of the priority of the instruction. The redundancy history of the instructions may therefore be statistically analyzed to better assign instruction priority.

As those skilled in the art will recognize as obvious, the redundancy predictor value 25 may be updated as subsequent executions of the program reveal whether the instruction was determined to be redundant during each execution of the program. Moreover, the redundancy predictor value 25 may be updated, or reset, if a subsequent execution of the program determines that the instruction has a priority other than redundant.

In one embodiment, the redundancy predictor value 25 for each instruction is associated with the instruction pointer 15 for each instruction. The redundancy predictor values 25 and instruction pointers 15 may be stored in memory or on the processor itself. Additionally, since instructions may be decomposed into one or more microinstructions, the redundancy predictor value 25 may further be associated with the microinstruction index (not shown) of each of the microinstructions.

It should be noted that during any execution of the program, an instruction would only be found to be redundant when first, the operation itself writes on a destination and second, a subsequent instruction also writes on that same destination. Thus, the redundancy predictor value 25 indicates the likelihood that during a subsequent execution of the program, the destination of the redundant instruction will likely be written on again. Accordingly, the redundancy predictor value 25 may be referred to as a potential written on bit 25. By examining the redundancy predictor value 25, the processor can determine the potential for an instruction to be written on. Thus, having the written on history can help predict and initially set a likely to be written on" bit of an instruction in accordance with that instruction's redundancy predictor value 25.

As a result, the redundancy predictor value 25, in part, determines the priority of the instruction. In the alternative, the priority assigned each instruction may depend directly on the combination of the states of the written on, the subsequent use, and potentially written on bits. For example assume that the redundancy predictor value 25 for one instruction indicates that the instruction was determined to be redundant during a previous execution of the program, and the redundancy predictor value 25 for a second instruction indicates that the second instruction was non-redundant. If the priority of both the first and the second instructions were determined to be Low during a current execution, the second, non-redundant and therefore higher priority, instruction would be executed first.

Figure 5:
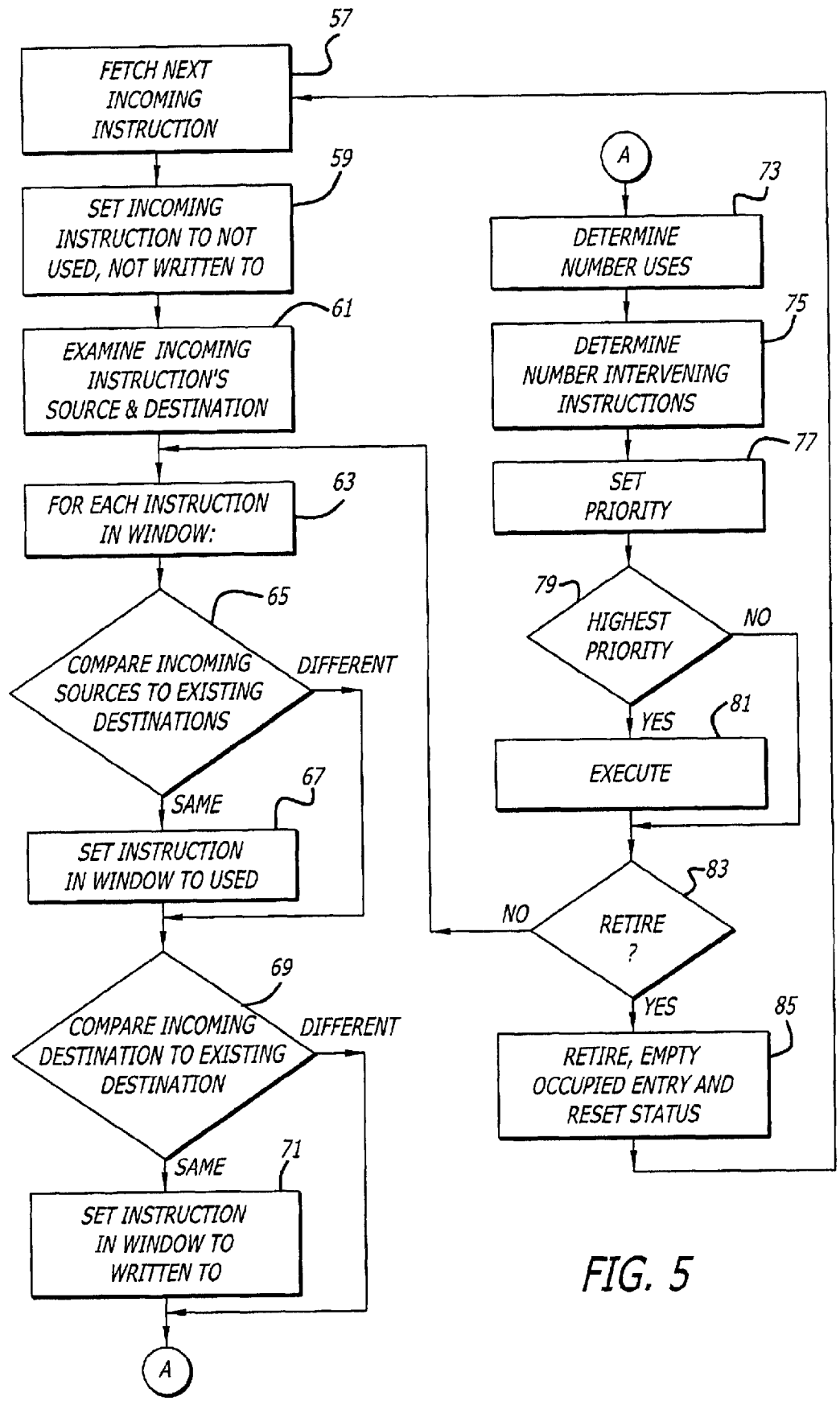
FIG. 5 is an exemplary flow-chart of an embodiment of the invention.

Referring now to FIG. 5, an embodiment of the method for practicing the invention is illustrated. The method begins in block 57, when an entry in the instruction window becomes empty or the processor is initialized. The next instruction is fetched from memory and enters the instruction window. Either before, during or after the instruction enters the instruction window, the used and written on bits of that incoming instruction may be initialized to a "not used" state and a "not written on" state in block 59. At generally the same time, the source and destination of the incoming instruction are examined in block 61. Having determined which source and destination the incoming instruction uses, the method proceeds to block 63. As will be obvious to those skilled in the art, an instruction may have multiple sources, destinations or both. In such a case, as with DMA or MMX instructions, each of the multiple sources and destinations are examined in the fashion described herein for a single source or destination.

In block 63, the method begins comparing the incoming instruction to those instructions that already exist in the instruction window. It can be assumed that these existing instructions have already been fetched from the memory and placed in the instruction window. Using the processor dependency tracking mechanism, any instruction within the instruction window whose destination is used as a source of the incoming instruction is located. See block 65. Then that existing instruction whose destination is used as a source of the incoming instruction, is set to a "used" state in block 67. If it is desired to refine the priority, to be set in block 77, the number of subsequent uses for the destination of the existing instruction may also be changed accordingly in block 67.

In block 69, using the processor dependency tracking mechanism, any instruction within the instruction window whose destination is the same as the destination of the incoming instruction is located. Then that existing instruction, whose destination is also the destination of the incoming instruction, is set to a "written on" state in block 71. Of course, if it is desired to default a particular instruction, or class of instructions to a given state (e.g. "written on" and "not used"), blocks 65 to 71 may be skipped. In lieu of executing blocks 65 to 71, default values of the used and written on bits are set as desired.

In block 73, the number of subsequent uses of the destination of the existing instruction may be determined. In block 75, the number of instructions intervening between the existing instruction and the next subsequent instruction to use the same destination may also be determined.

Based on the used bit and the written on bit and, the priority of the existing instruction is determined, as described previously. See block 77. Furthermore, the priority may be refined using the use count and the intervening instruction count. At this point, the processor may immediately execute the instruction with the highest priority of those instructions currently in the instruction window. The incoming instruction may even be executed if it has the highest priority, as would be the case if the incoming instruction was defaulted to a higher priority than any other existing instruction. Or the incoming instruction can be excluded from consideration for execution during the first cycle in which the incoming instruction is in the instruction window. Also, if a redundancy predictor is employed (see FIG. 2), the priority level of the instruction is recorded.

As shown in FIG. 5 at block 79, the existing instruction that has just been compared to the incoming instruction in blocks 65–77, may be considered for execution. If that existing instruction has the highest priority of any existing instruction, then it is executed in block 81. Otherwise, the method continues with block 83. If the existing instruction has been executed then a check may be made to determine if the existing instruction has been retired, as in block 83. If the existing instruction has been executed and may be retired, then the following occurs. The retirement unit retires the instruction by storing the result of the operation into the appropriate destination (e.g. register or memory location), emptying the entry that the existing instruction occupies, and resetting the used, written on and other status bits as is appropriate (block 85 ). The retirement unit then signals that the fetcher may fetch another instruction from memory. The processor then begins another cycle as herein described.

On the other hand, the existing instruction may not have executed or may not be in a suitable condition to retire. For instance, the existing instruction may have a redundant priority. That is, the destination of the existing instruction may be subject to being written on by a subsequent instruction and there may be no intervening instruction that uses that destination. Thus, based on the instructions currently in the instruction window, execution of the existing instruction would be useless. However, until the subsequent instruction actually writes on the destination of the existing, useless instruction, it may be desirable to preserve the information that the existing, useless instruction would create and write on the destination if the existing, useless instruction were to execute. Thus, in some circumstances it may be desirable to delay the retirement of the existing, useless instruction, until its destination is actually written on by the subsequent instruction. In the alternative, lowering the priority of the useless instruction to redundant will allow instructions on the critical path of the program to proceed by freeing resources that would otherwise be consumed by the useless instruction.

Accordingly, if the existing instruction has not executed or is not ready for retirement, the next existing instruction is examined as previously describe in blocks 63 to 81.

Instructions to execute the process described above may be stored on a machine-readable medium. If instructions are stored so that a machine may execute them the instructions may be referred to as code. The machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (i.e., carrier waves, infrared signals, digital signals, etc.); etc. The processor described herein may be incorporated into a computer system. The system may include memory, input/output devices and other processors in communication with the processor. The sources and destinations of the instructions processed by the processor may be addressable locations in the processor, in memory or in input/output devices. As those skilled in the art will appreciate, the present invention provides a method, system and apparatus for detecting and eliminating useless instructions. The present invention thus provides faster and more efficient program execution over the prior art.

The preferred embodiments of the present invention are thus described. While the present invention has been described in particular embodiments, the present invention should not be construed as limited by such embodiments but rather construed according to the claims that follow below.

What is claimed is:

1. A method, comprising:

examining a first instruction to determine a first destination that the first instruction will write on, the first instruction to be in an instruction window;

examining a second instruction to determine a first source that the second instruction will use and a second destination that the second instruction will write on, the second instruction to enter the instruction window;

setting a written on bit associated with the first instruction to a written on state if the first destination and the second destination will be the same operand;

setting a used bit associated with the first instruction to a used state if the first destination and the first source will be the same operand;

determining a priority of the first instruction from the written on and used bits; and determining a number of times that at least one instruction to enter the instruction window after the first instruction will use the first destination as a source for the at least one instruction to enter the instruction window after the first instruction.

2. The method of claim 1, further comprising:

determining that the first instruction is useless if the first destination and the second destination are the same operand and if no instruction to enter the instruction window after the first instruction and before the second instruction will use the first destination as a source for the at least one instruction to enter the instruction window after the first instruction and before the second instruction.

3. The method of claim 2, further comprising eliminating the first instruction from the instruction window.

4. The method of claim 3, wherein the eliminating of the first instruction is delayed until the second instruction writes on the second destination.

5. A method, comprising:

examining a first instruction to determine a first destination that the first instruction will write on, the first instruction to be in an instruction window;

examining a second instruction to determine a first source that the second instruction will use and a second destination that the second instruction will write on, the second instruction to enter the instruction window;

setting a written on bit associated with the first instruction to a written on state if the first destination and the second destination will be the same operand;

setting a used bit associated with the first instruction to a used state if the first destination and the first source will be the same operand;

determining a priority of the first instruction from the written on and used bits;

determining that the first instruction is useless if the first destination and the second destination are the same operand and if no instruction to enter the instruction window after the first instruction and before the second instruction will use the first destination as a source for the at least one instruction to enter the instruction window after the first instruction and before the second instruction; recording whether the instruction was useless, and predicting whether the instruction will be useless based on the recording whether the instruction was useless in past occurrences.

6. A method, comprising:

examining a first instruction to determine a first destination that the first instruction will write on, the first instruction to be in an instruction window;

examining a second instruction to determine a first source that the second instruction will use and a second destination that the second instruction will write on, the second instruction to enter the instruction window;

setting a written on bit associated with the first instruction to a written on state if the first destination and the second destination will be the same operand;

setting a used bit associated with the first instruction to a used state if the first destination and the first source will be the same operand;

determining a priority of the first instruction from the written on and used bits;

determining how many instructions will enter the instruction window after the first instruction and before the second instruction if the first destination and the first source are the same operand; and, refining the priority of the first instruction based on the how many instructions will enter the instruction window after the first instruction and before the second instruction if the first destination and the first source are the same operand.

7. A processor, comprising:

an instruction window including a plurality of instruction entries including a first instruction entry and a second instruction entry, each instruction entry including an instruction field to be occupied by an instruction, a written on bit, a used bit, and a priority field determined from the written on bit and the used bit, the used bit of the first instruction entry has a default value to be based on the type of instruction occupying the instruction field; and a fetcher to store a prior instruction in the first instruction entry and to store a subsequent instruction in the second instruction entry, the prior instruction and the subsequent instruction include a source and a destination.

8. The processor of claim 7, wherein the written on bit of the first instruction entry to be set to a written on state if the destination of the prior instruction and the destination of the subsequent instruction are the same operand.

9. The processor of claim 7, wherein the used bit of the first instruction entry to be set to a used state if the source of the subsequent instruction and destination of the prior instruction are the same operand.

10. The processor of claim 7, further comprising the processor being configured to record a priority of at least one instruction.

11. A processor, comprising:

an instruction window including a plurality of instruction entries including a first instruction entry and a second instruction entry, each instruction entry including an instruction field to be occupied by an instruction, a written on bit, a used bit, and a priority field determined from the written on bit and the used bit, the used bit of the first instruction entry to be set to a used state if the source of the subsequent instruction and destination of the prior instruction are the same operand; and a fetcher to store a prior instruction in the first instruction entry and to store a subsequent instruction in the second instruction entry, the prior instruction and the subsequent instruction include a source and a destination, the fetcher to further store one or more instructions that intervene between the prior instruction and the subsequent instruction in one or more instruction entries of the plurality of instruction entries by including an intervening instruction field in each of the plurality of entries.

12. The processor of claim 11, wherein when the destination of the prior instruction and the destination of the subsequent instruction are the same operand, the intervening instruction field of the first instruction entry is to be set to indicate how many of the one or more instruction entries are occupied by the one or more instructions that intervene between the prior instruction and the subsequent instruction.

13. A processor, comprising:

an instruction window including a plurality of instruction entries including a first instruction entry and a second instruction entry, each instruction entry including an instruction field to be occupied by an instruction, a written on bit, a used bit, and a priority field determined from the written on bit and the used bit;

a fetcher to store a prior instruction in the first instruction entry and to store a subsequent instruction in the second instruction entry, the prior instruction and the subsequent instruction include a source and a destination; and a used count field of the first instruction entry to determine how many instruction entries other than the first instruction entry are occupied by instructions including a source that is the destination of the prior instruction.

14. A processor, comprising:

an instruction window including a plurality of instruction entries including a first instruction entry and a second instruction entry, each instruction entry including an instruction field to be occupied by an instruction, a written on bit, a used bit, and a priority field determined from the written on bit and the used bit;

a fetcher to store a prior instruction in the first instruction entry and to store a subsequent instruction in the second instruction entry, the prior instruction and the subsequent instruction include a source and a destination;

means for record a priority of at least one instruction; and means for predicting the priority of the at least one instruction based on the recorded priority.

15. A processor comprising:

an instruction window having a plurality of instruction entries including a first instruction entry, a second instruction entry, and a third instruction entry of the plurality of instruction entries, each instruction entry including an instruction field to be occupied by an instruction, a written on bit, a used bit, and a priority field determined from the written on bit and the used bit and an intervening instruction field of the first instruction entry to determine how many of the plurality of instruction entries is occupied by an intervening instruction if the source of the subsequent instruction is the destination of the prior instruction and if no source of the intervening instructions is the destination of the prior instructions;

a memory;

a fetcher to fetch instructions from the memory and to store a prior instruction in the first instruction entry and to store a subsequent instruction in the second instruction entry, both the prior instruction and subsequent instruction include a source, a destination, the written on bit of the first instruction entry to be set to a written on state if the destination of the prior instruction and the subsequent instruction are the same operand, and the used bit of the first instruction entry to be set to a used state if the source of the subsequent instruction and the destination of the prior instruction are the same operands, the fetcher is further to store an instruction that intervenes between the prior instruction and the subsequent instruction in the third instruction entry; and, an intervening instruction field of the first instruction entry to determine how many of the plurality of instruction entries is occupied by an intervening instruction if the source of the subsequent instruction is the destination of the prior instruction and if no source of the intervening instructions is the destination of the prior instruction.

16. The processor of claim 15, wherein the first instruction entry comprises a used count field to determine how many instruction entries other than the first instruction entry are occupied by instructions including a source that is the destination of the prior instruction.

17. The processor of claim 15, being configured to record a priority of at least one instruction.

18. The processor of claim 17, being further configured to predict the priority of the at least one instruction based on the recorded priority.

19. A circuit, comprising:

a written on logic to determine a written on bit;

a used logic to determine a used bit; and, a priority logic to determine a priority based on the written on and the used bits, the written on, used and priority logics to be associated with a first instruction entry of a plurality of instruction entries in an instruction window, the plurality of instruction entries to include a second instruction entry, the first instruction entry to be occupied by a prior instruction and the second instruction entry to be occupied by a subsequent instruction, the first and second instructions each include a source and a destination, the priority logic to set the priority to redundant if the written on bit is set to a written on state and the used bit is set to a not used state.

20. The circuit of claim 19, further comprising the written on logic to set the written on bit to a written on state if the destination of the subsequent instruction is the same operand as the destination of the prior instruction.

21. The circuit of claim 19, further comprising the used logic to set the used bit to a used state if the source of the subsequent instruction is the destination of the prior instruction.

22. The circuit of claim 19, further comprising:

an intervening instruction logic to determine whether a third instruction entry of the plurality of instruction entries is occupied by an instruction that intervenes between the prior instruction and the subsequent instruction.

23. The circuit of claim 19, further comprising:

a recording logic to record the priority of at least one instruction.

24. A circuit comprising:

a written on logic to determine a written on bit;

a used logic to determine a used bit; and, a priority logic to determine a priority based on the written on and the used bits, the written on, used and priority logics to be associated with a first instruction entry of a plurality of instruction entries in an instruction window, the plurality of instruction entries to include a second instruction entry, the first instruction entry to be occupied by a prior instruction and the second instruction entry to be occupied by a subsequent instruction, the first and second instructions each include a source and a destination; and a used count logic to determine how many of the plurality of instruction entries are occupied by an instruction that is subsequent to the prior instruction and that has a source that is the same operand as the destination of the prior instruction.

25. A circuit comprising:

a written on logic to determine a written on bit;

a used logic to determine a used bit; and, a priority logic to determine a priority based on the written on and the used bits, the written on, used and priority logics to be associated with a first instruction entry of a plurality of instruction entries in an instruction window, the plurality of instruction entries to include a second instruction entry, the first instruction entry to be occupied by a prior instruction and the second instruction entry to be occupied by a subsequent instruction, the first and second instructions each include a source and a destination; and a predicting logic to predict the priority of the at least one instruction based on the recorded priority.

* * * * *